US011269591B2

(12) United States Patent
Shetty et al.

(10) Patent No.: US 11,269,591 B2
(45) Date of Patent: Mar. 8, 2022

(54) ARTIFICIAL INTELLIGENCE BASED RESPONSE TO A USER BASED ON ENGAGEMENT LEVEL

(71) Applicant: International Business Machines Corporation, Armonk, NY (US)

(72) Inventors: Shilpa Shetty, Bangalore (IN); Mithun Das, Howrah (IN); Amitabha Chanda, Salt Lake (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 16/445,375

(22) Filed: Jun. 19, 2019

(65) Prior Publication Data

US 2020/0401370 A1     Dec. 24, 2020

(51) Int. Cl.
*G10L 15/22*     (2006.01)
*G06F 3/16*     (2006.01)
(Continued)

(52) U.S. Cl.
CPC ............. *G06F 3/167* (2013.01); *G06N 20/00* (2019.01); *G10L 15/18* (2013.01); *G10L 15/22* (2013.01); *G10L 17/22* (2013.01)

(58) Field of Classification Search
CPC ....... G06F 3/3167; G06N 20/00; G10L 15/18; G10L 15/22; G10L 17/22
See application file for complete search history.

(56) References Cited

U.S. PATENT DOCUMENTS 9,609,102 B1    3/2017   Cooper
2015/0149179 A1*    5/2015   Korbecki ................ G10L 13/00
                                                                                                      704/260
(Continued)

FOREIGN PATENT DOCUMENTS

WO     2003026250 A1     3/2003

OTHER PUBLICATIONS

Barr, "Amazon's Alexa to reward children who behave politely", Apr. 27, 2018, Independent, 18 pps., <https://www.independent.co.uk/life-style/health-and-families/amazon-alexa-reward-polite-children-manners-voice-commands-ai-america-a8325721.html>.
(Continued)

*Primary Examiner* — Daniel C Washburn
*Assistant Examiner* — Athar N Pasha
(74) *Attorney, Agent, or Firm* — Stephen R. Yoder

(57) ABSTRACT

Aspects of the present invention disclose a method for delivering an artificial intelligence-based response to a voice command to a user. The method includes one or more processors identifying an audio command received by a computing device. The method further includes determining a first engagement level of a user, wherein an engagement level corresponds to an attentiveness level of the user in relation to the computing device based at least in part on indications of activities of the user. The method further includes identifying a first set of conditions within an immediate operating environment of the computing device, wherein the first set of conditions indicate whether to deliver a voice response to the identified audio command. The method further includes determining whether to deliver the voice response to the identified audio command to the user based at least in part on the first engagement level and first set of conditions.

12 Claims, 3 Drawing Sheets

(51) Int. Cl.
    *G06N 20/00*     (2019.01)
    *G10L 15/18*     (2013.01)
    *G10L 17/22*     (2013.01)

(56) References Cited

U.S. PATENT DOCUMENTS

| | | |
|---|---|---|
| 2016/0236690 A1 | 8/2016 | Juneja |
| 2017/0061316 A1 | 3/2017 | Tur |
| 2017/0162197 A1 | 6/2017 | Cohen |
| 2017/0371407 A1 | 12/2017 | Vertegaal |
| 2018/0061415 A1 | 3/2018 | Penilla |
| 2019/0213465 A1* | 7/2019 | Avrahami ............ G10L 15/197 |
| 2019/0251701 A1* | 8/2019 | Shukla .................. G06N 5/04 |
| 2019/0378519 A1* | 12/2019 | Dunjic ................... G10L 17/00 |
| 2021/0201914 A1* | 7/2021 | Gagne .................. G06K 9/0063 |

OTHER PUBLICATIONS

Perez, "Amazon Alexa now responds to certain questions with skills that can help you when Alexa can't", TC, 15 pps., 2 years ago, <https://techcrunch.com/2017/09/05/amazon-alexa-now-responds-to-certain-questions-with-skills-that-can-help-you-when-alexa-cant/>.

Sullivan, "Apple Explains How It's Making Siri Smart Without Endangering User Privacy", Sep. 11, 2017, 12 pps., <https://www.fastcompany.com/40443055/apple-explains-how-its-making-siri-smart-without-endangering-user-privacy>.

* cited by examiner

ARTIFICIAL INTELLIGENCE BASED RESPONSE TO A USER BASED ON ENGAGEMENT LEVEL

BACKGROUND OF THE INVENTION

The present invention relates generally to the field of mobile devices, and more particularly to artificial intelligence-based responses of virtual assistants.

In recent years, developments in digital assistants and the growth of Internet of Things (IoT) capable devices have created competition to introduce new voice interfaces (e.g., for smart speakers, virtual assistance hardware/software, etc.). The IoT is a network of physical devices embedded with electronics, software, sensors, and connectivity which enables these devices to connect and exchange data with computer-based systems. Technology is embedded in IoT-enabled devices that allow these devices to communicate, interact, be monitored, and controlled over the Internet.

Natural language processing (NLP) is a branch of artificial intelligence that helps computers understand, interpret, and manipulate human language. Natural language processing encompasses a broad range of tasks that often intertwine in a practical setting. For example, a computer can apply speech recognition and parsing to a voice recording to gain an understanding of what the voice recording is conveying.

Cognitive analytics combines the use of cognitive computing and analytics. Cognitive computing combines artificial intelligence and machine-learning algorithms, in an approach that attempts to reproduce the behavior of the human brain. Analytics is the scientific process of transforming data into insights for making better decisions. Cognitive analytics applies intelligent technologies to bring unstructured data sources within reach of analytics processes for decision making.

SUMMARY

Aspects of the present invention disclose a method, computer program product, and system for delivering an artificial intelligence-based response to a voice command to a user. one or more processors identifying an audio command received by a computing device. The method further includes determining a first engagement level of a user, wherein an engagement level corresponds to an attentiveness level of the user in relation to the computing device based at least in part on indications of one or more activities of the user. The method further includes one or more processors identifying a first set of conditions within an immediate operating environment of the computing device, wherein the first set of conditions indicate whether to deliver a voice response to the identified audio command. The method further includes one or more processors determining whether to deliver the voice response to the identified audio command to the user based at least in part on the first engagement level and the first set of conditions.

DETAILED DESCRIPTION

Embodiments of the present invention allow for determining an appropriate set of conditions (e.g., defined timeframe, activities, etc.) for delivering an artificial intelligence-based response with respect to an engagement level (e.g., attentiveness level, activities, etc.) of a user. Embodiments of the invention utilize a comparative priority between the engagement level of the user and the artificial intelligence-based response being delivered to determine an appropriate method for increasing the engagement level of the user to deliver the artificial intelligence-based response. Embodiments of the invention determine the appropriate set of conditions exist in order to deliver, redeliver, and/or delegate the artificial intelligence-based response utilizing historical data of the user interaction (e.g., defined timeframe, activities, attentiveness level, activities, etc.) with the artificial intelligence-based response.

Some embodiments of the present invention recognize that digital assistants lack a current capability to determine whether and/or when execution of a task corresponding to a voice command is appropriate. For example, a user gives a voice command to a digital assistant requesting a showtime of a television program and before the digital assistant executes a voice response the user walks out of the room and the digital assistant delivers the response to an empty room. Embodiments of the present invention resolve this problem by identifying a set of conditions based on data of a user, the operating environment of the digital assistant, internet of thing (IoT) devices, and historical data, to determine when and how to deliver a voice response to the user.

Embodiments of the present invention can provide an improvement in the function of a system by reducing the amount of processing resources a device utilizes by reducing the amount of voice commands processed due to a lack of engagement of a user during the execution of a response to the voice command. Embodiments of the present invention utilize a plurality of sensors in proximate to a user to automate delivery of a response to a voice command. Further, embodiments of the present invention reduce the amount of power a system consumes by preempting delivery of a response to a voice command to a user when delivery is inappropriate and/or ineffective to convey response to the user. Thus, reducing the processing resources and power consumption due to the cumulative effect of repetitive delivery of responses.

Implementation of embodiments of the invention may take a variety of forms, and exemplary implementation details are discussed subsequently with reference to the Figures.

Figure 1:
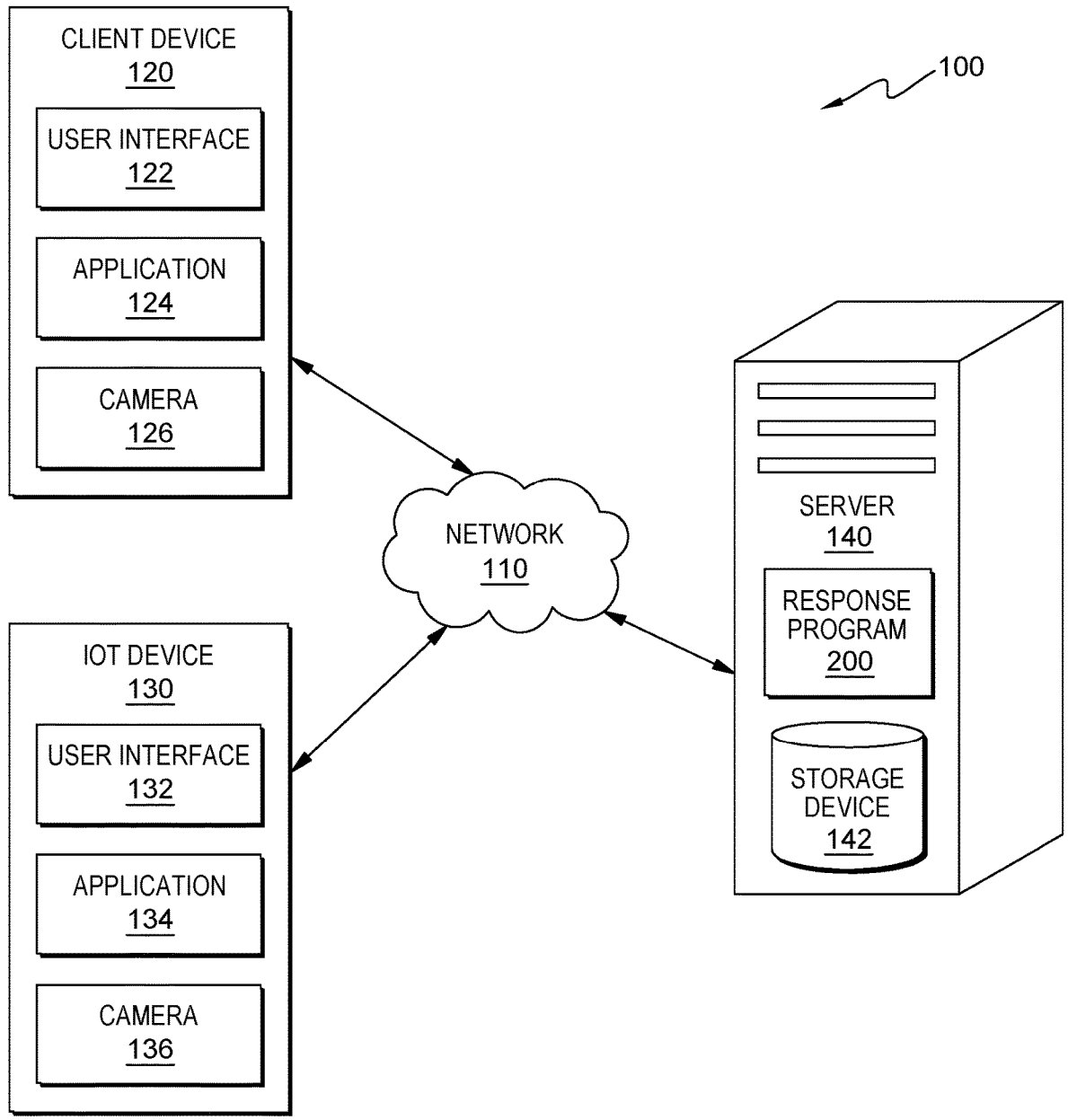
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In various embodiments of the present invention, accessible sources of personal data may include personal devices (e.g., client device 120, IoT device 130, etc.), social media content, and/or publicly available information. In at least one of the various embodiments, the user can optionally include a privacy component that enables the user to opt-in or opt-out of exposing information, such as personal information. The privacy component enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

In the depicted embodiment, distributed data processing environment 100 includes, client device 120, IoT device 130, and server 140, all interconnected over network 110. Distributed data processing environment 100 may include additional computing devices, mobile computing devices, servers, computers, storage devices, or other devices not shown. An embodiment of data processing environment 100 includes client device 120, IoT device 130, and server 140, all interconnected over network 110. In one embodiment, client device 120, listening device 130, and server 140 communicate through network 110. Network 110 can be, for example, a local area network (LAN), a telecommunications network, a wide area network (WAN), such as the Internet, or any combination of the three, and include wired, wireless, or fiber optic connections. In general, network 110 can be any combination of connections and protocols, which will support communications between client device 120, IoT device 130, and server 140, in accordance with embodiments of the present invention.

Client device 120 and IoT device 130 are representative of a web server or any other electronic device or computing system capable of processing program instructions and receiving and sending data. In various embodiments of the present invention, client device 120 and IoT device 130 may be a workstation, personal computer, digital video recorder, media player, personal digital assistant, mobile phone, or any other device capable of executing computer readable program instructions, in accordance with embodiments of the present invention. In other embodiments, client device 120 and IoT device 130 may represent a server computing system utilizing multiple computers as a server system, such as in a cloud computing environment. In general, client device 120 and IoT device 130 is representative of any electronic device or combination of electronic devices capable of executing machine readable program instructions as described in greater detail with regard to FIG. 3, in accordance with embodiments of the present invention.

Client device 120 and IoT device 130 include respective instances of a user interface (i.e., user interface 122 and user interface 132), applications (i.e., application 124 and application 134), and cameras (i.e., camera 126 and camera 136), which each correspond to a respective device and can perform equivalent functions.

In various embodiments of the present invention, a user interface is a program that provides an interface between a user of a device and a plurality of applications that reside on the client device. Generally, a user interface is a program that provides an interface between a user of client device 120 and a plurality of applications that reside on client device 120 and/or may be accessed over network 110. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Client device 120 and IoT device 130 include respective instances of an application (i.e., application 124 and application 134), which correspond to a respective device and can perform equivalent functions in the respective devices. In various embodiments of the present invention an application frequently serves to provide a user with similar services accessed on personal computers (e.g., web browser, video conference program, data syncing program, or other media, etc.). In one embodiment, application 124 transfers and/or receives data to and from a user, IoT device 130, and/or server 140. For example, application 124 transmits text of a webpage a user is currently interacting with to response program 200, which analyzes the text to determine whether the text corresponds to a voice command received by client device 120 from the user. In another example, response program 200 utilizes application 134 to transmit a message that includes a response to a voice command received by IoT device 130 (e.g., a smart speaker) to application 124 of client device 120.

Client device 120 and IoT device 130 include respective instances of a camera (i.e., camera 126 and camera 136), which corresponds to a respective device and can perform equivalent functions in the respective devices. Generally, camera 126 and camera 136 are representative of a digital camera that captures photographs, images, and/or video in digital memory. In the depicted embodiment, camera 126 and camera 136 respectively reside on client device 120 and IoT device 130 (e.g., mobile phone, tablet, laptop etc. with an integrated camera). In another embodiment, camera 126 and camera 136 are a standalone camera (not shown) connected over network 110. In one embodiment, response program 200 utilizes camera 126 to capture images of a user to determine an engagement level of a user. In another embodiment, response program 200 utilizes camera 126 to capture images of a user to determine whether the user is conversing with another person present in the operating environment of IoT device 130.

Server 140 may be a management server, a web server, or any other electronic device or computing system capable of receiving and sending data. In some embodiments, server 140 may be a laptop computer, a tablet computer, a netbook computer, a personal computer (PC), a desktop computer, a personal digital assistant (PDA), a smart phone, or any programmable device capable of communication with client device 120 and IoT device 130 over network 110. In other embodiments, server 140 may represent a server computing system utilizing multiple computers as a server system, such as in a cloud computing environment.

Server 140 includes storage device 142 and response program 200. Storage device 142 can be implemented with any type of storage device, for example, persistent storage 305, which is capable of storing data that may be accessed and utilized by client device 120, IoT device 130 and server 140, such as a database server, a hard disk drive, or a flash memory. Storage device 142 stores numerous types of data which may include database or repository. In various embodiments of the present invention storage device 142 may include a plurality of databases that include voice commands, user interactions, engagement levels, etc. In one embodiment, response program 200 utilizes data of storage device 142 to create a historical database, which response program 200 utilizes to determine an appropriate time and method for delivering a response to a voice command.

Response program 200 is an artificial intelligence-based system that analyzes data of an environment and additional devices to derive a set of conditions and deliver a response to a voice command to a user with respect to the set of conditions. In one embodiment, response program 200 determines an engagement level of a user utilizing data of client device 120 and IoT device 130. For example, response program 200 uses video and audio data of IoT devices to determine an attentiveness score of a user based on eye gaze, activities, biometric data, and/or tone analysis of the user. In this example, response program 200 can utilize a video-based eye-tracker utilizing video data of a camera of a smart phone of a user or webcam (e.g., IoT device 130) to determine of whether a gaze direction of a user is in the direction of or away from client device 120 (e.g., smart speaker, PDA, etc.). Furthermore, response program 200 utilizes audio data received from the microphone (not shown) to determine using natural language processing (NLP) to determine whether a user is engaged in a conversation with another person, and the topic of the conversation. Additionally, response program 200 can assign a score of zero (0) to one hundred (100) to activities of the user that are combined to construct the attentiveness score of the user. Also, the assigned score may be inversely proportional to indication that a user is not attentive to client device 120.

In another embodiment, response program 200 determines an appropriate time to deliver a response to a voice command to a user utilizing data of client device 120 and IoT device 130. For example, response program 200 uses data of IoT devices to identify conditions (e.g., time constraints, activities, etc.) of a user that may impede the user receiving a response to a voice command. In this example, a time constraint may be a time limit associated with a task corresponding to the voice command, an activity where a user is fully engaged (i.e. having a low activity score), etc. Furthermore, response program 200 determines a time to deliver a response to a voice command based on determined time constraints and/or historical interaction of a user in a similar set of conditions.

In another embodiment, response program 200 utilizes historical data associated with interactions of a user with client device 120 to determine a set of conditions that are appropriate to deliver a response to a voice command. For example, storage device 142 includes a user action database that is a collection of conditions that exist and action of a user with respect to the conditions and a voice command. In this example, the user action database includes a record of the user giving a command to "pause" a voice response to the voice command while the user changes the channel on a smart television.

Additionally, response program 200 may include in the record that the gaze of the user is fixed in direction of the smart television for an extended time period (i.e., the user is not looking in the direction of client device 120 and is focused on the smart television) and that this is not an appropriate set of conditions to deliver the voice response. Furthermore, response program 200 uses the actions database to identify appropriate sets of conditions to deliver a voice response in real and/or near real-time. In another example, response program 200 detects a voice response to a voice command is submitted while the user is typing a paper on a tablet (e.g., performing an activity, attentiveness score is low, etc.), and based on a record (e.g., file, row, etc.) of a user action database that the user repeats the voice command under this set of conditions. Response program 200 prompts client device 120 to repeat the voice response.

In yet another embodiment, response program 200 determines a method of delivery based on a comparative priority of a set conditions derived from data client device 120 and/or IoT device 130. In various embodiments of the present invention, a comparative priority may be defined by a user manually or by user preferences derived by the system, which include a hierarchy of conditions (e.g., user engagement, time constraints, emergencies, status of an identified individual, activity classification, etc.). For example, a user gives a voice command to "call work" to a smart speaker (e.g., client device 120) of the user and then starts playing music on a tablet (e.g., IoT device 130). In this example, response program 200 determines an attentiveness score for the user based on an eye gaze of the user from video data of the camera of the tablet and audio level of the music from settings data of a music application (e.g., application 124).

Additionally, response program 200 can utilize priority preferences to determine whether response program 200 should prompt the user that the call, in response to the voice command, is about to be performed (i.e., does a work call rank higher than listening to music). Furthermore, response program 200 determines that the call ranks higher than the current activity (e.g., listening to music) and determines that the best method to deliver the prompt is to flash lights of the smart speaker off and on until the eyes of the user are directed toward the smart speaker before delivering the prompt (i.e., adding a condition that would increase the attentiveness score of the user or drawing the attention of the user). In another example, an activity of a user ranks higher than the task corresponding to a command. In this example, response program 200 may either wait until the current song playing ends or send a notification to a tablet of the user to remind the user of the corresponding task.

Figure 2:
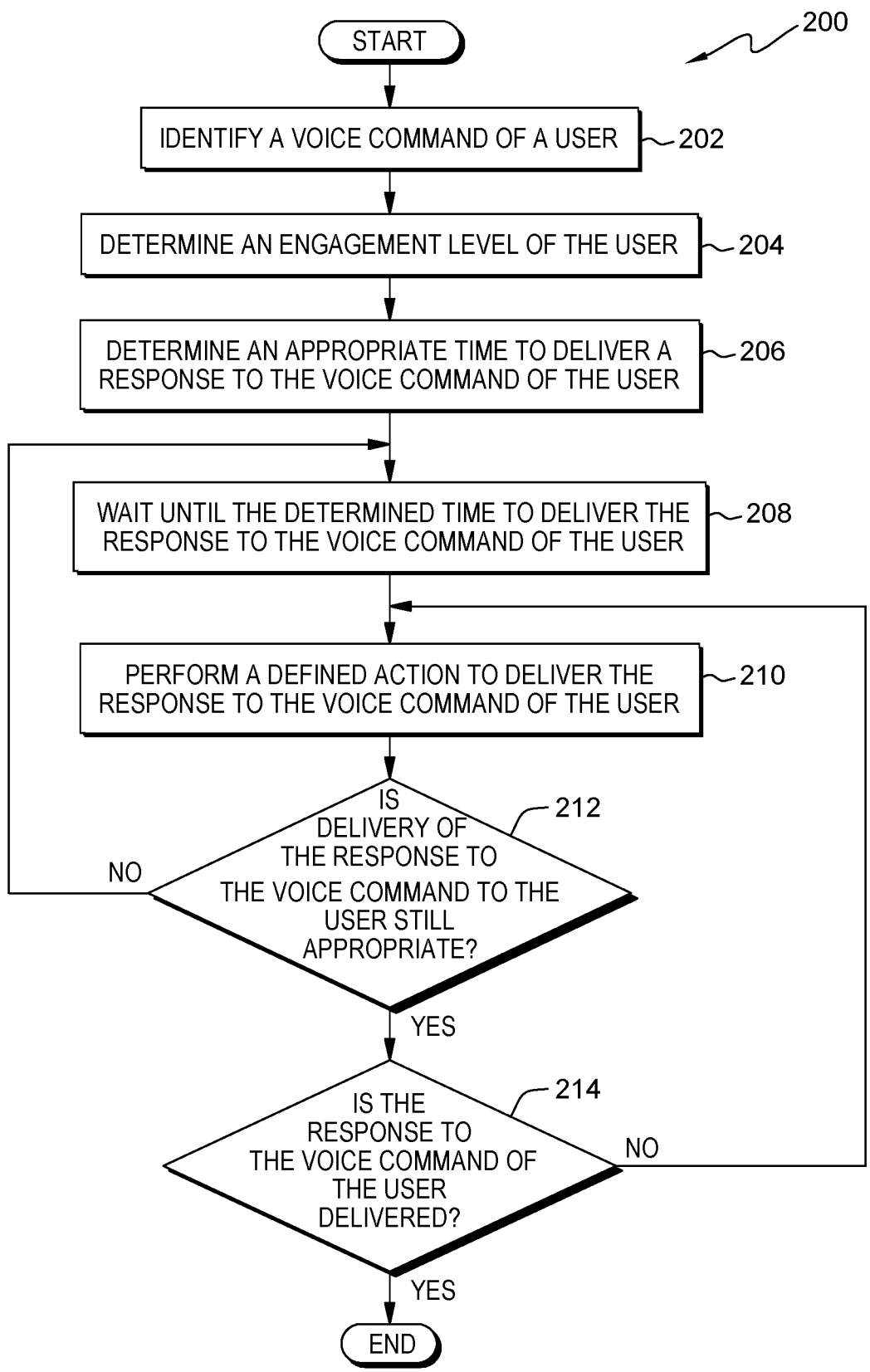
FIG. 2 is a flowchart depicting operational steps of a program for delivering an artificial intelligence-based response to a voice command to a user, in accordance with embodiments of the present invention.

FIG. 2 is a flowchart depicting operational steps of response program 200, a program for determining an appropriate set of conditions (e.g., defined time-frame, activities, etc.) for delivering an artificial intelligence-based response to a voice command to a user with respect to an engagement level (e.g., attentiveness level, activities, etc.) of the user, in accordance with embodiments of the present invention. In one embodiment, response program 200 initiates in response to client device 120 detecting a wake-up command, in accordance with embodiments of the present invention. For example, response program 200 initiates when a smart speaker (e.g., client device 120) receives a voice command that requires the smart speaker to activate and receive further voice commands. In another embodiment, response program 200 is continuously monitoring client device 120. For example, prevention program 200 is constantly monitoring activities of a smart speaker after a user links the smart speaker (e.g., client device 120) with an account of a server that includes response program 200.

In step 202, response program 200 identifies a voice command of a user. In one embodiment, client device 120 receives a wake-up command and response program 200 analyzes client device 120 to identify a subsequent voice command of a user. For example, response program 200 uses speech recognition (e.g., NLP) to identify a voice command that corresponds to a specific task. In this example, response program 200 determines whether the specific task corresponding to the voice command requires a voice reply, and if so, identifies the execution sequence (e.g., method of delivery, method of performance, etc.) that corresponds to the specific task.

In another embodiment, response program 200 analyzes data of IoT device 130 and client device 120 to identify conditions that exist in the operating environment of client device 120. For example, response program 200 retrieves data (e.g., audio, video, etc.) from the operating environment of a smart speaker (e.g., client device 120) and data of smart devices (e.g., audio, video, text, biometric, etc.) within the operating environment of the smart speaker to identify a current set of conditions (e.g., user activities, user engagement level, etc.) associated with a user within the operating environment of the smart speaker.

In step 204, response program 200 determines an engagement level of the user. In one embodiment, response program 200 utilizes data retrieved from client device 120 and IoT device 130 to identify factors of an engagement level of a user. For example, response program 200 analyzes video, audio, textual, and/or biometric data to identify factors (e.g., eye gaze direction, people, activities, conversations, vital signs, etc.) that can affect an engagement level of a user. In this example, response program 200 uses the identified factors to determine if the user is engaged in another discussion or activity (i.e., the user is busy performing another activity, looking at a mobile device, reading content, conversing with another person etc.). Additionally, response program 200 can use image and sensor feed analysis to determine whether the activity or the discussion content is related to the voice reply corresponding to the received voice command.

In another embodiment, response program 200 determines whether a user meets a required engagement level for delivery of a response to a voice command. For example, response program 200 uses video data of a smart camera (e.g., IoT device 130) to detect a current activity of a user. In this example, response program 200 detects that the user is currently interacting with a television (e.g., changing channel) and not within a threshold distance of a smart speaker (e.g., client device 120). Furthermore, response program 200 determines that the user does not meet a required threshold criterion due to the detected conditions indicating the user is a threshold distance away from the smart speaker and is looking at another device (i.e., is not currently engaged with the smart speaker).

In another example, response program 200 uses video data of a smart camera (e.g., IoT device 130) to detect a current activity of a user. In this example, response program 200 detects that the user is currently looking in the direction of a smart speaker (e.g., client device 120) and within a threshold distance of the smart speaker. Furthermore, response program 200 determines that the user meets a required threshold criterion due to the detected conditions indicating the user is within a threshold distance of the smart speaker and is looking at the smart speaker (i.e., is currently engaged with the smart speaker).

In another embodiment, response program 200 determines an attentiveness score corresponding to an engagement level of a user. For example, response program 200 identifies factors indicating a user is not attentive to a voice reply of the received voice command and deducts a value associated with each identified factor from a starting attentiveness score of one hundred (100) on a scale of zero (0) to one hundred (100). Additionally, response program 200 can assign each identified factor a weight (e.g., value, integer, etc.) to affect the starting attentiveness score equally or according to preferences of a user. In this example, response program 200 uses a video-based eye-tracker through data of a camera of a mobile device (e.g., IoT device 130) to determine a user is looking in the direction of the mobile device (i.e., not looking in the direction of client device 120), and analyzes the text of a reader application (e.g., application 134) of the mobile device to determine that the textual data is not relevant to the voice reply. Furthermore, response program 200 identifies three (3) factors (i.e., gaze direction, activity, and activity not relevant) and deducts the values associated with each factor (e.g., 10) from the starting attentiveness score (e.g., 100) to derive an attentiveness score of seventy (70) for a current engagement level of the user.

In various embodiments, response program 200 can access devices that a user registers with response program 200 (i.e., have opted-in to providing information to response program 200) to determine activities of the user in the operating environment of client device 120. In example embodiments, individuals can register a device with response program 200 (e.g., an IoT device owner permits response program 200 to access and utilize data of sensors of the IoT device). In additional embodiments, response program 200 can prompt an individual associated with smart watch to determine whether the individual authorizes response program 200 to access and utilize data of the smart watch. For example, response program 200 determines that IoT device 130 includes an available camera and response program 200 sends a prompt to an individual utilizing IoT device 130, requesting approval to access and utilize a video feed of the camera.

In step 206, response program 200 determines an appropriate time to deliver a response to the voice command of the user. In one embodiment, response program 200 utilizes identified factors of an engagement level of a user (in step 204) to determine an appropriate time to deliver a response to a voice command client device 120 receives. In one scenario, response program 200 identifies a user is talking to a person (e.g., an activity factor) and an eye gaze direction of the user is not in the direction of the smart speaker (e.g., biometric factor). In this scenario, response program 200 determines that the current set of conditions within the operating environment of the smart speaker do not indicate that the current instance is an appropriate time to deliver a voice reply to the user due to a lack of user attentiveness (e.g., low engagement level). In another scenario, response program 200 identifies a user is no longer talking to a person and an eye gaze direction of the user is in the direction of the smart speaker. In this scenario, response program 200 determines that the current set of conditions within the operating environment of the smart speaker indicate that the current instance is an appropriate time to deliver a voice reply to the user due to an increase of user attentiveness (e.g., high engagement level).

In another embodiment, response program 200 utilizes an engagement level score to determine an appropriate time to deliver a response to a voice command client device 120 receives. For example, response program 200 determines an attentiveness score (e.g., engagement level) of a user based on factors identified in the operating environment of the smart speaker and compares the attentiveness score of the user to a threshold attentiveness score. In this example, if responsive program 200 determines that the attentiveness score of the user is greater than the threshold attentiveness score, then responsive program 200 determines that the current set of conditions of the operating environment of the smart speaker indicate an appropriate time to deliver a voice reply to the user. In another scenario, if responsive program 200 determines that the attentiveness score of the user is less than or equal to the threshold attentiveness score, then responsive program 200 continues to monitor the operating environment for a set of conditions that indicate an appropriate time to deliver a voice reply to the user.

In yet another embodiment, response program 200 utilizes data of storage device 142 to determine an appropriate time to deliver a response to a voice command client device 120 receives. For example, response program 200 utilizes data of a historical database (e.g., storage device 142) of past user interactions with a smart speaker (e.g., client device 120) that correspond to instances of appropriate delivery times for voice replies to identify a current set of conditions, user actions, and/or factors in the operating environment of the smart speaker that indicate an appropriate time to deliver a voice reply to the user.

In various embodiments of the present invention the user or the system may define comparative priority by a hierarchy of preferential parameters (e.g., activity type, time constraints, engagement level, status of an identified person, emergency situations, topics, etc.), which may be input manually or generated by the system based on historical interactions of the user with client device 120. In one embodiment, response program 200 utilizes a comparative priority to determine an appropriate time to deliver to a user a response to a voice command of the user client device 120 receives.

For example, a user gives a voice command (e.g., order movie tickets) to a smart speaker (e.g., client device 120) and the smart speaker processes the voice command and generates a confirmation voice reply. Additionally, response program 200 identifies that the purchase confirmation for the movie tickets must be received by a host server within a period of (5) five minutes (i.e., time constraint). Furthermore, response program 200 identifies the user is watching a news program (i.e., activity type) on a smart television (e.g., IoT device 130) based on data of the smart television guide application (e.g., application 134). In this example, response program 200 determines that the identified time constraint of the voice reply ranks higher than the identified activity type based on preferences of the user (i.e., response program 200 determines that the appropriate time to deliver the confirmation voice reply is within five minutes due to the priority of the identified time constraint).

In another example, a user gives a voice command (e.g., order movie tickets) to a smart speaker (e.g., client device 120) and the smart speaker processes the voice command and generates a confirmation voice reply. Additionally, response program 200 identifies that the movie is scheduled to start in (3) three hours (i.e., time constraint). Furthermore, response program 200 identifies the user is talking to a supervisor (i.e., status of identified person) about a work project (i.e., activity type) on a mobile device using NLP and data of a contact application of the mobile device. In this example, response program 200 determines that the identified time constraint of the voice reply (e.g., three hours) ranks lower than the identified activity type and status of the identified person based on preferences of the user (i.e., response program 200 determines that the appropriate time to deliver the confirmation voice reply is after the identified activity but within three hours due to respective priorities of the identified activity and time constraint).

In step 208, response program 200 waits until the determined time to deliver the response to the voice command of the user. In one embodiment, response program 200 delays execution of delivery of a response to a voice command until an engagement level of a user exceeds a threshold level. For example, if responsive program 200 determines that the attentiveness score of the user is less than or equal to the threshold attentiveness score, then responsive program 200 delays delivery of a voice reply until the operating environment includes a set of conditions that indicate an appropriate time to deliver the voice reply to the user (i.e., waits until the engagement level is above a threshold level).

In another embodiment, response program 200 delays execution of delivery of a response to a voice command with respect to a determined comparative priority to deliver a response to a voice command of a user client device 120 receives to the user. For example, response program 200 performs an ephemeral delay in delivering the confirmation voice reply to a user in response to response program 200 determining that the appropriate time to deliver the confirmation voice reply is within five minutes due to the priority of the identified time constraint (in step 206). In another example, response program 200 delays delivery of the confirmation voice reply to a user until the identified activity is complete in response to response program 200 determining that the appropriate time to deliver the confirmation voice reply is after the identified activity but within three hours due to respective priorities of the identified activity and time constraint (in step 206).

In step 210, response program 200 performs a defined action to deliver the response to the voice command of the user. In one embodiment, response program 200 transmits client device 120 instructions to perform a function that corresponds to the voice command. For example, if response program 200 determines that a set conditions exist in the operating environment of a smart speaker that indicate that delivery of a voice reply is appropriate, then response program 200 gives the smart speaker instructions to execute a play command to deliver the voice reply. In another embodiment, response program 200 transmits client device 120 instructions to perform a task that increases an engagement level of a user. For example, if response program 200 determines that an attentiveness score of a user is below a threshold attentiveness score, then response program 200 may give a smart speaker instructions to execute a task (e.g., increasing volume, playing audible sound, flash lights, send notification to an IoT device, repeat voice reply, etc.) that may draw the attention of the user (i.e., increase the attentiveness score of the user). In yet another embodiment, response program 200 gives client device 120 instructions to delegate performance of a response to a voice command of a user to IoT device 130. For example, if response program 200 determines that an attentiveness score of a user is below a threshold attentiveness score, but also determines that due to a time constraint delivery of the voice reply has a higher comparative priority than an activity type of the attentiveness score, then response program 200 may give a smart speaker instructions to transfer the voice reply to an authorized mobile device (e.g., IoT device 130), which plays the voice reply to the user. In this example, response program 200 may deliver the voice reply to an identified person based on interactions of a user stored in a historical database (e.g., storage device 142).

In decision step 212, response program 200 determines whether delivery of the response to the voice command to the user is still appropriate. In various embodiments of the present invention, response program 200 continuously monitors post-delivery behavior of a user (e.g., receiving a stop command, user repeating voice command, engagement level decrease, etc.) to determine whether delivery of a response to a voice command is still appropriate. In one embodiment, response program 200 utilizes image and sensor data of client device 120 and IoT device 130 to identify factors of an engagement level of a user to determine whether to continue to deliver a response to a voice command. For example, while responding to a voice query, response program 200 identifies additional factors of an engagement level of a user (e.g., the user is discussing a topic of the voice reply to the voice query with another person, not attentive, etc.). In this example, response program 200 determines a current attentiveness score of the user and determines whether the attentiveness score of the user is greater than a threshold attentiveness score (i.e., determines whether time of delivery is still appropriate). Furthermore, response program 200 can utilize a comparative priority to determine whether delivery of the voice reply is still appropriate.

If response program 200 determines that delivery of the response to the voice command to the user is not still appropriate (decision step 212, "NO" branch), then response program 200 returns to step 208 and waits until response program 200 determines an appropriate time to deliver of the voice reply to the user. For example, if response program 200 identifies the gaze direction of a user is directed towards a mobile device and the website on the browser of the mobile device is not related to the voice reply, then response program 200 waits until response program 200 identifies factors of the user engagement level, and determines a comparative priority between the voice reply and the identified factors to determine an appropriate time to deliver the voice reply. In another example, if response program 200 determines that an attentiveness score of a user is below a threshold attentiveness score (i.e., no longer appropriate for delivery), then response program 200 gives the smart speaker instructions to execute a pause command to stop delivering the voice reply and delays execution of the delivery task until response program 200 determines an appropriate time for delivery of the voice reply.

In decision step 214, response program 200 determines whether the response to the voice command of the user is delivered. More specifically, in response to determining that the engagement level or the determined time are still appropriate for the response to the voice command of the user (decision step 212, "YES" branch), then response program 200 determines whether the response to the voice command of the user is delivered. For example, if response program 200 determines a current attentiveness score of a user is greater than a threshold attentiveness score, then response program 200 determines whether a smart speaker is performing a task that corresponds to a voice query. In one embodiment, response program 200 determines whether client device 120 has completed a response to a voice command of a user. For example, response program 200 monitors a smart speaker to determine whether the smart speaker has run instructions corresponding to a voice reply of a voice query of a user.

If response program 200 determines that client device 120 has not completed a response to a voice command of a user (decision step 214, "NO" branch), then response program 200 allows client device 120 to continue to perform a defined action. For example, if response program 200 determines that a smart speaker has not run all instructions corresponding to a voice reply of a voice query of a user, then response program 200 continues to play (e.g., defined action) the voice reply of the voice query of the user. In this example, step 212 and step 214 can be performed concurrently or consecutively (i.e., a defined action (e.g., pause, delegate, etc.) may change in real and/or near real-time based on changes in factors of the operating environment of client device 120).

If response program 200 determines that client device 120 has completed a response to a voice command of a user (decision step 214, "YES" branch), then response program 200 continues to monitor client device 120 to detect when client device 120 receives a voice command. For example, if response program 200 determines that a smart speaker has run all instructions corresponding to a voice reply of a voice query of a user, then response program 200 runs as a background program and continuously monitors the smart speaker to detect a wake-up command. In an example embodiment, responsive to response program 200 determining that a response to a voice command is delivered, response program 200 may terminate, sleep, or end until response program 200 re-initiates.

Figure 3:
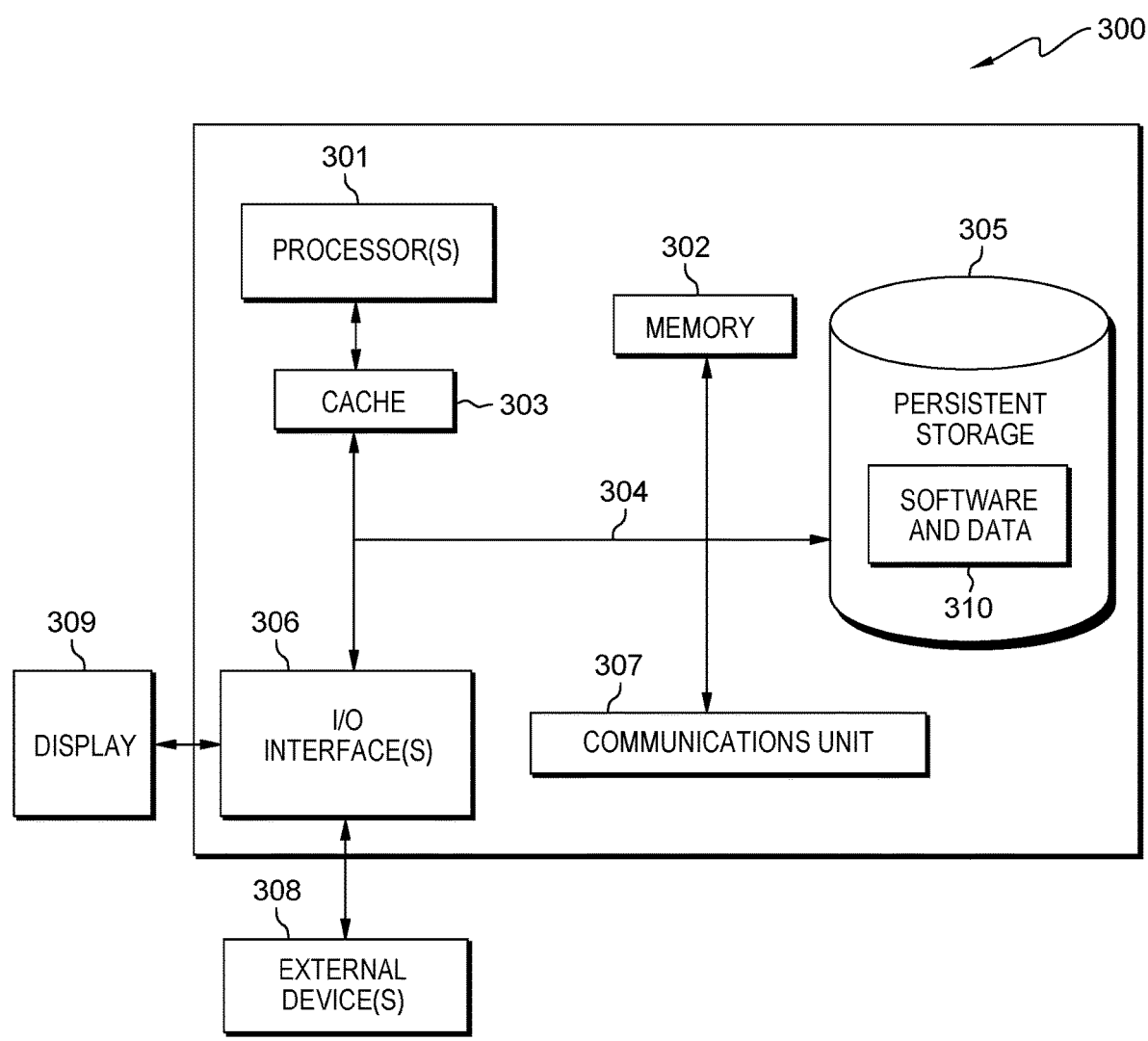
FIG. 3 depicts a block diagram of components of a computing system representative of the client device, IoT device, and server of FIG. 1, in accordance with an embodiment of the present invention.

FIG. 3 depicts computer system 300, which is representative of client device 120, IoT device 130, and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made. Computer system 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 120, software and data 310 includes data of application 124 and camera 126. With respect to IoT device 130, software and data 310 includes data of application 134 and camera 136. With respect to server 140, software and data 310 includes data of response program 200.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more processors, an audio command from a user of a computing device;
   identifying, by the one or more processors, a voice response to deliver to the user based on the received audio command;
   determining, by the one or more processors, a current engagement level of the user based, at least in part, on an attentiveness level of the user in relation to the computing device;
   in response to the current engagement level of the user being below a threshold value:
      delaying, by the one or more processors, a playback of the voice response; and
      determining, by the one or more processors, a time to deliver the voice response to the identified audio command to the user based, at least in part, on the current engagement level of the user, one or more current conditions of an operating environment associated with the computing device, and a priority associated with the delivery of the voice response;
   identifying, by the one or more processors, the user is in proximity to a second computing device;
   determining, by the one or more processors, a second engagement level of the user while in proximity to the second computing device based, at least in part, on a second attentiveness level of the user in relation to the second computing device; and
   in response to a determination that the user's second engagement level is above the threshold value, delivering, by the one or more processors, the voice response for playback on the second device within the determined time to deliver.

2. The method of claim 1, the method further comprising:
   in response to a determination that the user's second engagement level is below the threshold value, determining, by the one or more processors, a passage of time since the playback of the voice response was delayed;
   in response to a determination that the passage of time since the playback of the voice response was delayed exceeds the determined time to deliver, instructing, by the one or more processors, the second computing device to perform an action to increase the user's second engagement level with the second computing device.

3. The method of claim 2, wherein the action to increase the user's second engagement level with the second computing device is selected from the group consisting of: repeating the voice response, flashing lights, audible notifications, or increasing volume of the voice response.

4. The method of claim 1, wherein the priority associated with the delivery of the voice response is determined based, at least in part, on one or more of the following: activity type, time constraints, status of an identified person, emergency situation, and conversation topic.

5. A computer program product comprising:
   one or more computer readable storage media and program instructions stored on the one or more computer readable storage media, the program instructions comprising:
   program instructions to receive an audio command from a user of a computing device;
   program instructions to identify a voice response to deliver to the user based on the received audio command;
   program instructions to determine a current engagement level of the user based, at least in part, on an attentiveness level of the user in relation to the computing device;
   in response to the current engagement level of the user being below a threshold value:
      program instructions to delay a playback of the voice response; and
      program instructions to determine a time to deliver the voice response to the identified audio command to the user based, at least in part, on the current engagement level of the user, one or more current conditions of an operating environment associated with the computing device, and a priority associated with the delivery of the voice response;

program instructions to identify the user is in proximity to a second computing device;

program instructions to determine a second engagement level of the user while in proximity to the second computing device based, at least in part, on a second attentiveness level of the user in relation to the second computing device; and in response to a determination that the user's second engagement level is above the threshold value, program instructions to deliver the voice response for playback on the second device within the determined time to deliver.

6. The computer program product of claim 5, the method further comprising:

in response to a determination that the user's second engagement level is below the threshold value, determining, by the one or more processors, a passage of time since the playback of the voice response was delayed;

in response to a determination that the passage of time since the playback of the voice response was delayed exceeds the determined time to deliver, instructing, by the one or more processors, the second computing device to perform an action to increase the user's second engagement level with the second computing device.

7. The computer program product of claim 6, wherein the action to increase the user's second engagement level with the second computing device is selected from the group consisting of: repeating the voice response, flashing lights, audible notifications, or increasing volume of the voice response.

8. The computer program product of claim 5, wherein the priority associated with the delivery of the voice response is determined based, at least in part, on one or more of the following: activity type, time constraints, status of an identified person, emergency situation, and conversation topic.

9. A computer system comprising:

one or more computer processors;

one or more computer readable storage media; and program instructions stored on the computer readable storage media for execution by at least one of the one or more processors, the program instructions comprising:

program instructions to receive an audio command from a user of a computing device;

program instructions to identify a voice response to deliver to the user based on the received audio command;

program instructions to determine a current engagement level of the user based, at least in part, on an attentiveness level of the user in relation to the computing device;

in response to the current engagement level of the user being below a threshold value:

program instructions to delay a playback of the voice response; and program instructions to determine a time to deliver the voice response to the identified audio command to the user based, at least in part, on the current engagement level of the user, one or more current conditions of an operating environment associated with the computing device, and a priority associated with the delivery of the voice response;

program instructions to identify the user is in proximity to a second computing device;

program instructions to determine a second engagement level of the user while in proximity to the second computing device based, at least in part, on a second attentiveness level of the user in relation to the second computing device; and in response to a determination that the user's second engagement level is above the threshold value, program instructions to deliver the voice response for playback on the second device within the determined time to deliver.

10. The computer system of claim 9, the method further comprising:

in response to a determination that the user's second engagement level is below the threshold value, determining, by the one or more processors, a passage of time since the playback of the voice response was delayed;

in response to a determination that the passage of time since the playback of the voice response was delayed exceeds the determined time to deliver, instructing, by the one or more processors, the second computing device to perform an action to increase the user's second engagement level with the second computing device.

11. The computer system of claim 10, wherein the action to increase the user's second engagement level with the second computing device is selected from the group consisting of: repeating the voice response, flashing lights, audible notifications, or increasing volume of the voice response.

12. The computer system of claim 9, wherein the priority associated with the delivery of the voice response is determined based, at least in part, on one or more of the following: activity type, time constraints, status of an identified person, emergency situation, and conversation topic.

* * * * *